US010187319B1

(12) United States Patent
Kumar et al.

(10) Patent No.: US 10,187,319 B1
(45) Date of Patent: Jan. 22, 2019

(54) AUTOMATIC CONFIGURATION GENERATION FOR A PROXY OPTIMIZATION SERVER FOR OPTIMIZING THE DELIVERY OF CONTENT OF A WEB PUBLISHER

(71) Applicant: Instart Logic, Inc., Mountain View, CA (US)

(72) Inventors: Karan Kumar, Sunnyvale, CA (US); Sourabh Jain, Milpitas, CA (US); Hariharan Kolam, Sunnyvale, CA (US)

(73) Assignee: Instart Logic, Inc., Palo Alto, CA (US)

( * ) Notice: Subject to any disclaimer, the term of this patent is extended or adjusted under 35 U.S.C. 154(b) by 594 days.

(21) Appl. No.: 14/023,139

(22) Filed: Sep. 10, 2013

(51) Int. Cl.

| | |
|---|---|
| ***G06F 15/173*** | (2006.01) |
| ***H04L 12/911*** | (2013.01) |
| ***H04L 29/08*** | (2006.01) |
| ***H04L 12/24*** | (2006.01) |
| *G06F 17/30* | (2006.01) |

(52) U.S. Cl.
CPC .......... *H04L 47/70* (2013.01); *H04L 41/0823* (2013.01); *H04L 67/02* (2013.01); *H04L 67/2842* (2013.01); *G06F 17/3089* (2013.01)

(58) Field of Classification Search
CPC ..... H04L 47/70; H04L 67/02; H04L 41/0823; H04L 67/2842; G06F 17/2247; G06F 17/3089; G06F 17/2205
USPC .......................................................... 709/226
See application file for complete search history.

(56) References Cited

U.S. PATENT DOCUMENTS

| | | | | |
|---|---|---|---|---|
| 6,658,167 | B1 * | 12/2003 | Lee | H04L 67/42 382/305 |
| 6,678,250 | B1 * | 1/2004 | Grabelsky | H04L 43/06 370/241 |
| 6,904,463 | B1 * | 6/2005 | Fadel | H04L 67/2838 709/219 |
| 2003/0009591 | A1 * | 1/2003 | Hayball | H04L 29/06 709/245 |
| 2003/0149581 | A1 * | 8/2003 | Chaudhri | G06Q 30/0601 709/203 |
| 2004/0003117 | A1 * | 1/2004 | McCoy | A63B 53/04 709/246 |
| 2004/0215716 | A1 * | 10/2004 | Freudenthal | H04L 29/06 709/203 |
| 2004/0255008 | A1 * | 12/2004 | Olsen | G06F 1/3209 709/220 |
| 2008/0112629 | A1 * | 5/2008 | Chen | H04N 19/60 382/233 |

(Continued)

*Primary Examiner* — Arvin Eskandarnia
(74) *Attorney, Agent, or Firm* — Van Pelt, Yi & James LLP

(57) ABSTRACT

A method of determining one or more sources for delivery of content corresponding to a website is disclosed. Content from a plurality of initial sources is received through an interface. The content comprises content of a plurality of webpages of a website. Performance of the plurality of initial sources in delivering the content is evaluated. At least some of the content is copied to an alternative source. The content from the alternative source is received through the interface. Performance of the alternative source in delivering the content is evaluated. A determination of whether the alternative source should replace at least some of the plurality of initial sources as a source for delivering content of the website is made. The determination is based at least in part on the evaluated performances.

12 Claims, 7 Drawing Sheets

(56) References Cited

U.S. PATENT DOCUMENTS

| | | | | | |
|---|---|---|---|---|---|
| 2010/0131673 | A1* | 5/2010 | Freudenthal | H04L 67/2823 | 709/246 |
| 2010/0199318 | A1* | 8/2010 | Chang | H04N 7/17318 | 725/97 |
| 2010/0325303 | A1* | 12/2010 | Wang | G06Q 30/06 | 709/231 |
| 2011/0219019 | A1* | 9/2011 | Peng | G06F 15/16 | 707/769 |
| 2011/0243470 | A1* | 10/2011 | Noguchi | H04N 19/176 | 382/239 |
| 2011/0307238 | A1* | 12/2011 | Scoda | G06F 17/30905 | 703/26 |
| 2012/0030212 | A1* | 2/2012 | Koopmans | H04N 7/17318 | 707/741 |
| 2013/0103791 | A1* | 4/2013 | Gottdenker | H04L 67/02 | 709/217 |
| 2013/0166634 | A1* | 6/2013 | Holland | H04L 67/2804 | 709/203 |
| 2013/0219024 | A1* | 8/2013 | Flack | H04L 67/2804 | 709/219 |
| 2013/0339519 | A1* | 12/2013 | Lientz | H04L 41/0896 | 709/224 |
| 2014/0098685 | A1* | 4/2014 | Shattil | H04L 67/327 | 370/252 |
| 2014/0136952 | A1* | 5/2014 | Zhu | G06F 17/2247 | 715/234 |
| 2014/0164447 | A1* | 6/2014 | Tarafdar | G06F 17/30194 | 707/827 |
| 2014/0250168 | A1* | 9/2014 | Damola | H04L 67/327 | 709/203 |
| 2015/0156069 | A1* | 6/2015 | Wu | H04L 41/0816 | 709/221 |

* cited by examiner

AUTOMATIC CONFIGURATION GENERATION FOR A PROXY OPTIMIZATION SERVER FOR OPTIMIZING THE DELIVERY OF CONTENT OF A WEB PUBLISHER

BACKGROUND OF THE INVENTION

Typically, a web browser needs to receive dependent resources associated with different links and URLs before it can complete the rendering of a webpage. Efficient delivery of these dependent resources can significantly improve the end-user experience. Therefore, improved techniques for delivering different types of resources corresponding to a webpage would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
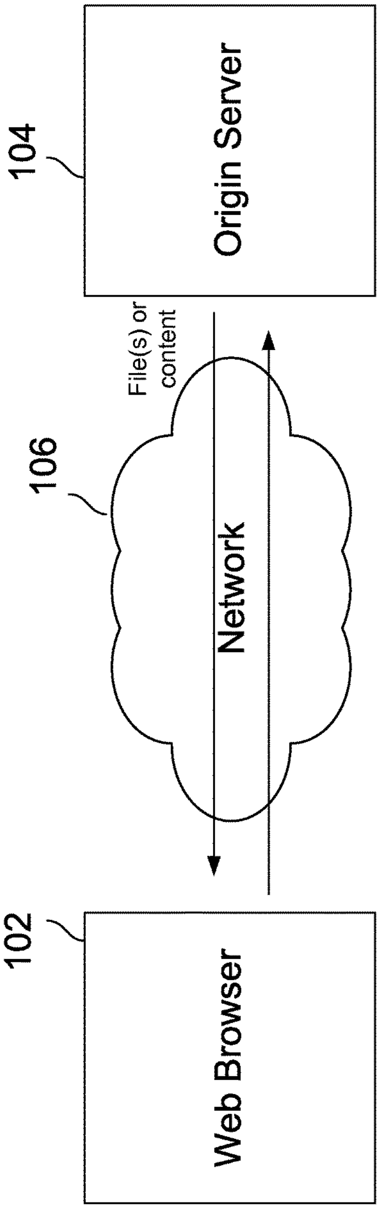
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 sends a request for a webpage to an origin server 104 (e.g., a web publisher, such as www.yahoo.com and www.cnn.com), and web browser 102 receives the content corresponding to the webpage through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustrative purposes only; accordingly, the present application is not limited to these specific examples.

Figure 2:
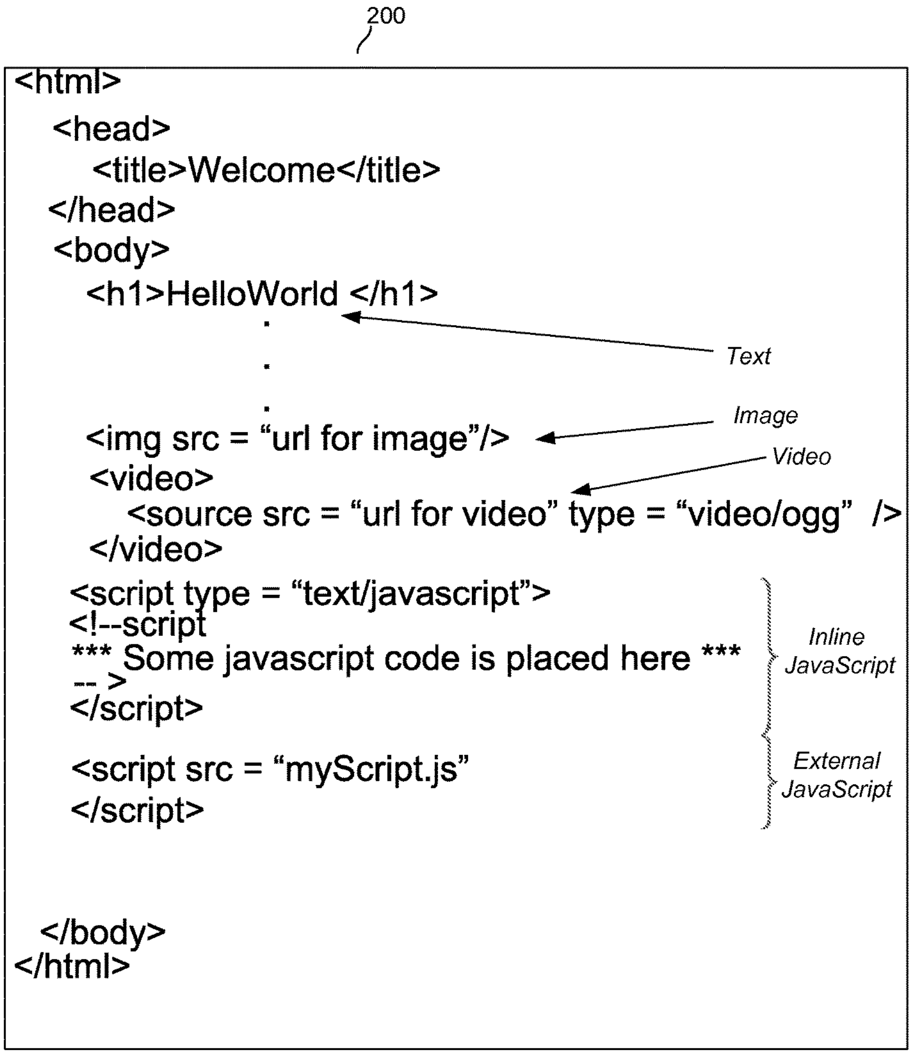
FIG. 2 is a diagram illustrating an embodiment of an HTTP response 200 returning an HTML file.

FIG. 2 is a diagram illustrating an embodiment of an HTTP response 200 returning an HTML file. To display the webpage, web browser 102 sends a Hypertext Transfer Protocol (HTTP) request message to origin server 104 requesting the HTML webpage file. After origin server 104 locates the requested HTML webpage file, origin server 104 returns the requested HTML webpage file in an HTTP response message to web browser 102. Web browser 102 then parses the received webpage and begins to process and render the webpage.

As shown in FIG. 2, the HTML file may include text, dependent resources, scripts, and the like. Examples of dependent resources include images, videos, and audio clips. These dependent resources are resources that need to be separately transferred from origin server 104 or from other servers to web browser 102. For example, as shown in FIG. 2, the list of dependent resources includes an image, which is stored at a location specified by an URL. To display the image on the webpage, web browser 102 sends a separate HTTP request message to the URL, and the image is returned in a separate HTTP response message from the URL.

The HTML file in FIG. 2 may include one or more scripts for making the webpage dynamic and interactive. For example, scripts may be used to manipulate the webpage's content and behavior or to respond to end-user actions. As shown in FIG. 2, the <script> tags (i.e., <script> and </script> tags) are used to define a client-side script, such as a JavaScript. A JavaScript may be either inline or external.

For inline JavaScripts, the JavaScript code is directly embedded and integrated into the HTML code in FIG. 2. JavaScript code may also be placed in external files. For example, external JavaScript files have the file extension .js. An external JavaScript file may be inserted into the HTML file by specifying a URL for the .js file in the "src" attribute of the <script> tag. The external JavaScript is another type of dependent resource, and is downloaded from the URL and then executed.

Figure 3:
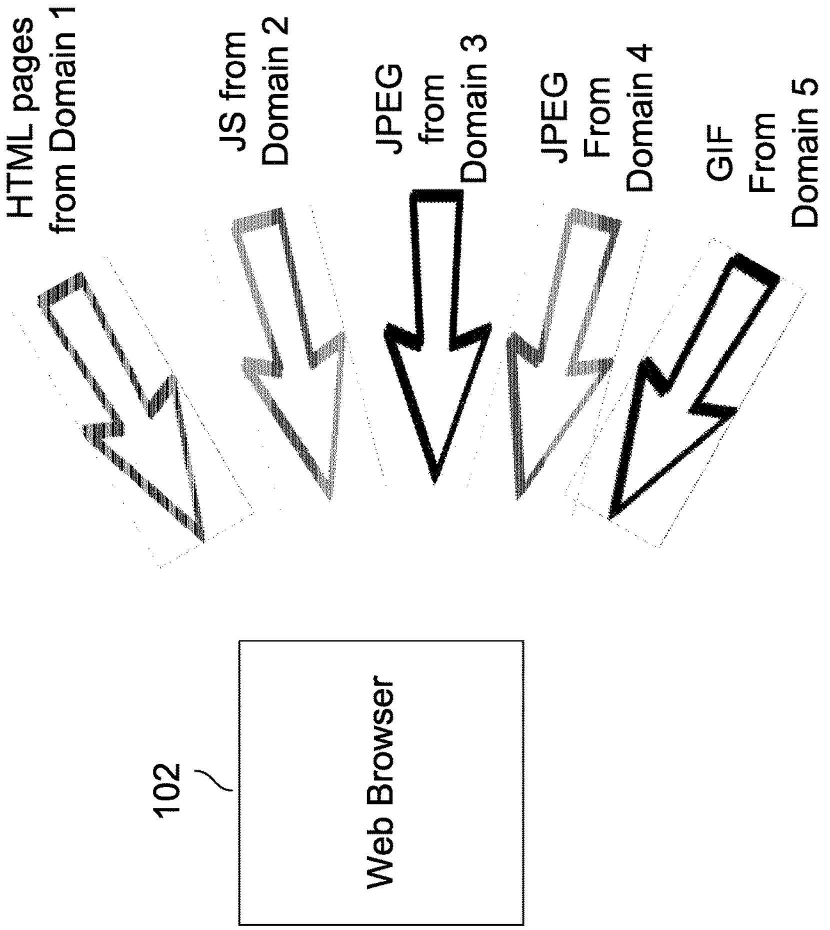
FIG. 3 is a block diagram illustrating that the referenced dependent resources and the webpages of a website may be hosted on multiple domains.

FIG. 3 is a block diagram illustrating that the referenced dependent resources and the webpages of a website may be hosted on multiple domains. As shown in FIG. 3, in a particular website, the HTML webpages of the website may be downloaded directly from the origin server 104 in domain 1, the referenced JavaScripts may be hosted by domain 2, a portion of the JPEG images may be hosted by domain 3, the remaining portion of the JPEG images may be hosted by domain 4, and the GIF images may be hosted by domain 4. Multiple domains are used to serve different dependent resources for different reasons. For example, web browser 102 may open multiple concurrent connections and download more dependent resources in parallel if the dependent resources are hosted on different domains. Furthermore, medium to large websites often move their static content (e.g., image and JavaScript files) to a CDN (content distribution network), because deploying this content across multiple geographically dispersed servers can reduce the download time of this content. As the CDN and origin server 104 have different domain names, the referenced dependent resources and the webpages are hosted on multiple domains.

The various domains associated with the referenced dependent resources of a webpage can be determined by parsing the webpage. For example, with reference to FIG. 2, the image file and the video file are indicated on the webpage as being stored in different locations, each specified by a URL. As each URL includes its domain information, the domains of the image and video files can be easily determined by parsing their respective URLs.

Figure 4:
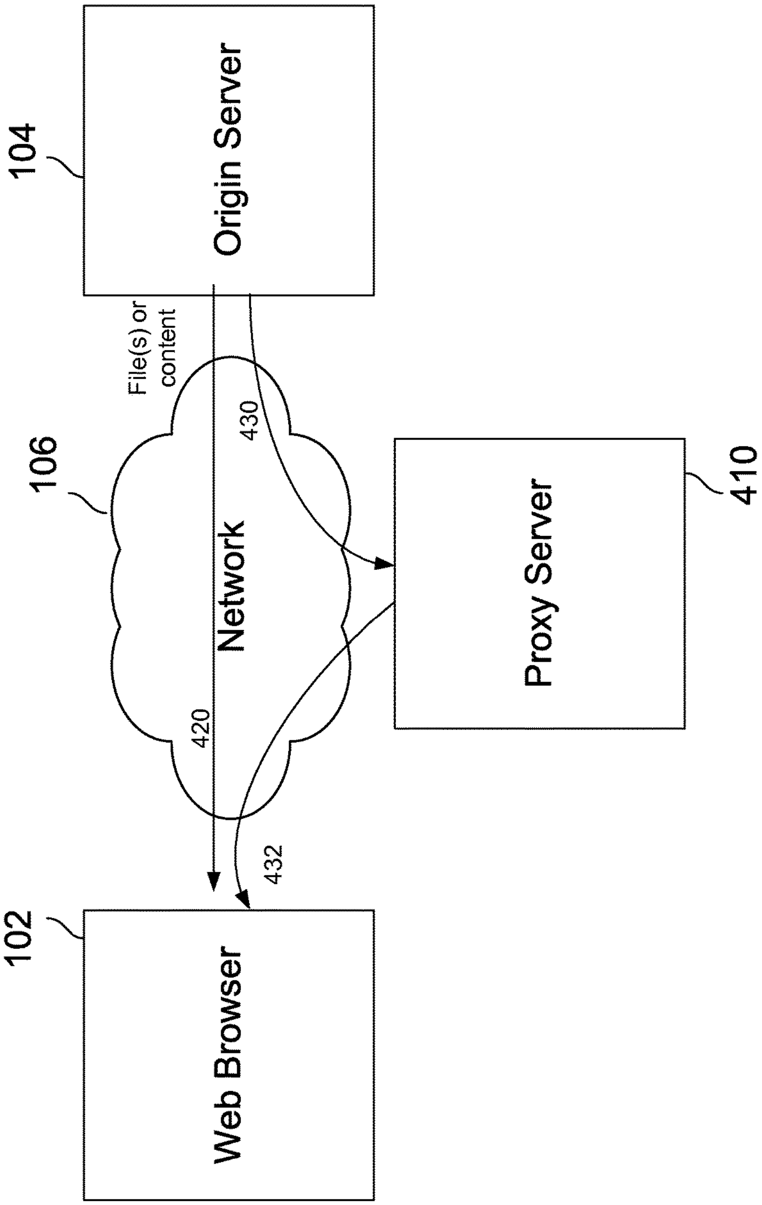
FIG. 4 is a block diagram illustrating that a proxy server 410 (e.g., an Instart edge server) is used to optimize the delivery of some of the content corresponding to the webpages of a website.

FIG. 4 is a block diagram illustrating a proxy server 410 (e.g., an Instart edge server) used to optimize the delivery of some of the content corresponding to the webpages of a website. As shown in FIG. 4, arrow 420 indicates that some of the dependent resources and the HTML webpages are delivered to web browser 102 without any optimization by proxy server 410. For instance, for this particular website, HTML webpages and dependent resources downloaded from domain 1, domain 2, and domain 3 are delivered to web browser 102 without any optimization by proxy server 410. This content may be served by origin server 104 or by external CDN nodes that are geographically closer to web browser 102. Arrow 430 indicates that proxy server 410 receives and stores the remaining of the content, and arrow 432 indicates that proxy server 410 further delivers the content to web browser 102 using different optimization techniques.

Proxy server 410 uses different optimization techniques to deliver different types of resources to web browser 102 and speed up the rendering of the webpages in different ways. The optimization techniques include, but are not limited to, HTML streaming, techniques for optimizing the delivery of JavaScripts, techniques for optimizing the delivery of JPEG images, PNG images, WebP images, and the like. Each of the optimization techniques has a set of configurable parameters.

The optimization technique for optimizing the delivery of JPEG images is briefly described herein as an illustrative example. However, the present application is not limited to this particular optimization technique only.

The optimization technique for optimizing the delivery of JPEG images includes the virtualization of the document object model (DOM) tree. The DOM is a standardized model supported by different web browsers to represent the various components of a webpage. With reference to FIG. 2, when web browser 102 renders the webpage on a screen, web browser 102 parses the received HTML webpage file and builds a DOM tree to represent the various components of the webpage in a local memory. For example, when the image tag (shown as <img src="url for image"/> in FIG. 2) is parsed by web browser 102, the image is represented as an image object, and the image object is inserted into the DOM tree accordingly. A client-server system may be used for virtualizing a DOM of a web browser. Virtualization of the DOM of a web browser allows the client-server system to take control of the DOM for different kinds of optimizations, while keeping the operations transparent to the web browser. Using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage without comprising the end-user's experience.

The optimization technique for optimizing the delivery of JPEG images further includes dividing a JPEG image file into a plurality of segments based on priorities and delivering the segments individually based on priorities. Traditionally, an image in progressive JPEG format is compressed in multiple passes of progressively higher detail. The initial passes include low frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon a http GET for an image, the entirety of the image is downloaded. In some instances, components of the webpage other than the image may have higher priority than the details of the progressively encoded image contained in the subsequent passes, and it would be advantageous to download these important components of the webpage before the high frequency components of the image. Therefore, the optimization technique for delivering JPEG images divides a progressive JPEG image file into a plurality of segments based on priorities, e.g., frequency. Using the virtualization engine, which has control of both ends of the communication in a client and server system, the lower frequency components of the image can be requested by the client and sent by the proxy server first, and subsequently the higher frequency components can be requested by the client and sent by the proxy server dynamically to refresh and sharpen the image at a later time, e.g., after other higher priority components of the webpage have been downloaded.

The optimization technique for optimizing the delivery of JPEG images has a set of configurable parameters that can be tuned based on different factors. One example of the configurable parameters is the segment sizes (e.g., the percentages of the original image file). For example, the initial segment size containing the lower frequency components of the image may be 10% of the total JPEG image, and the second segment containing the higher frequency components of the image may be 90% of the total JPEG image. In another example, the initial segment size may be 40% of the total JPEG image, and the second segment may be 60% of the total JPEG image. Another example of the configurable parameters is the minimum size threshold of the JPEG images beyond which the optimization technique is used to optimize the delivery of the JPEG images. For example, if a JPEG image has a size smaller than the configurable minimum size threshold (e.g., 80 Kbytes), then the delivery of the JPEG image is not optimized by proxy server 410.

Referring back to FIG. 4, as different web publishers may use different types and different amounts of dependent resources for their webpages and may distribute the different types of dependent resources across domains differently, the domains that are chosen to be optimized by proxy server 410 can be different in each case. The amount of extra processing by proxy server 410 may be traded off against the performance improvement achieved. For a web publisher that includes many JavaScripts in their webpages, the overall performance of the website may be significantly improved if the domains serving the JavaScript files are processed by proxy server 410. In another example, for a web publisher that includes many JPEG images but includes very few WebP images in their webpages, the domain corresponding to the JPEG images may be handled by proxy server 410, but the domain corresponding to the WebP images may be better handled by the origin server 104 and/or the CDN nodes.

Therefore, the choice of which domains are best optimized by proxy server 410 depends on many factors, including the distribution of types of resources among the domains, the computational complexity and overhead cost of the optimization techniques, the degree of performance improvement in delivering the content of a particular domain that can be achieved by proxy server 410, security concerns, and the like. In some embodiments, the domains corresponding to a web publisher that are selected to be handled by proxy server 410 may be determined based on aggregate performance. After the domains are selected, some or all of the optimization techniques may be enabled or disabled, either globally or on a per-webpage basis. The configurable parameters for the enabled optimization technique may also be tuned, either globally or on a per-webpage basis. The automatic determination of the domains that are handled by proxy server 410, the set of optimization techniques enabled, and the configurable parameters of the optimization techniques will be discussed in greater detail below.

Figure 5A:
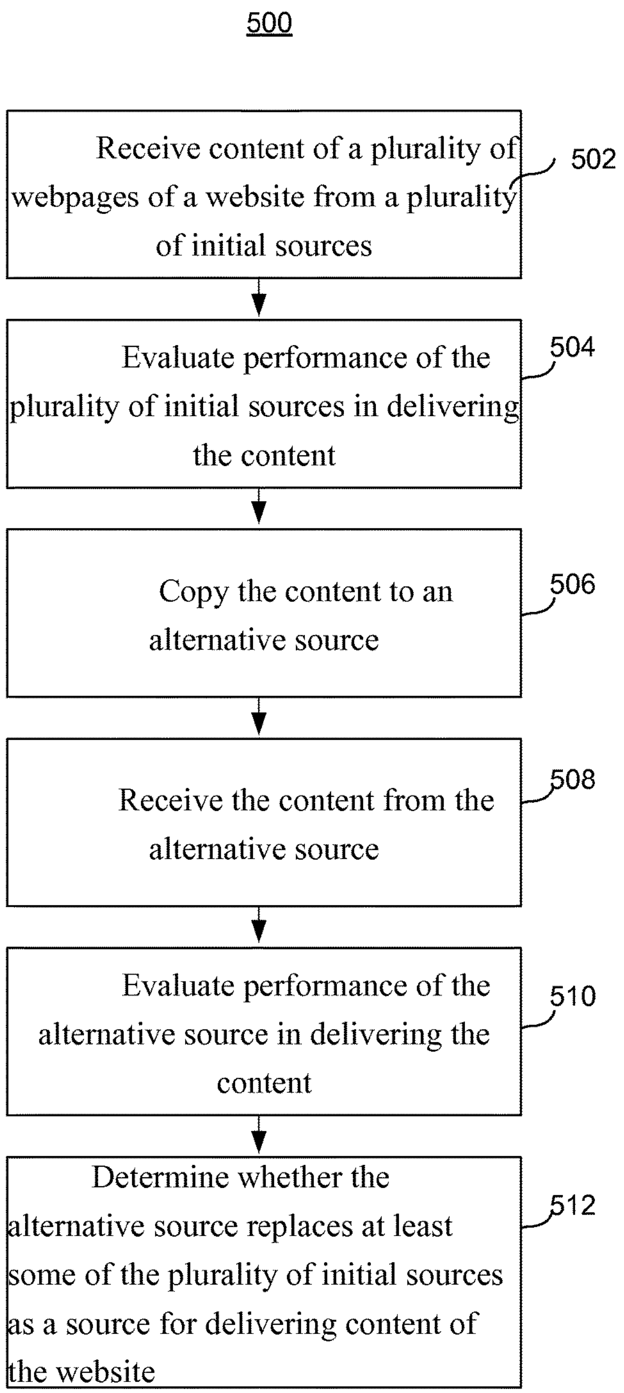
FIG. 5A is a flow chart illustrating an embodiment of a process 500 for determining one or more sources for delivery of content corresponding to a website.

FIG. 5A is a flow chart illustrating an embodiment of a process 500 for determining one or more sources for delivery of content corresponding to a website.

At 502, content from a plurality of initial sources is received through an interface. The content is the content of a plurality of webpages of a website. In some embodiments, each of the initial sources corresponds to a different domain. For example, with reference to FIG. 3, when web browser 102 accesses the webpages of the website, the HTML webpage files are downloaded from Domain 1, and the referenced dependent resources (e.g., JavaScripts, JPEG files, and GIF files) are downloaded from Domain 2, Domain 3, Domain 4, and Domain 5. An initial source may be an origin server or a CDN node. As a typical website usually includes many webpages, and the webpages have different characteristics and use different types of resources, a plurality of webpages of the website is downloaded for profiling the overall performance of the initial sources in delivering the content of the website.

At 504, the performance of the plurality of initial sources in delivering the content is evaluated. The performance can be measured using different metrics. One example of the metrics used for evaluating the performance is the time for downloading the content. Both individual performances and aggregate performances of the initial sources may be evaluated. There are many ways to measure the performances of the initial sources. Some illustrative examples include measuring the time for downloading each type of resources, the time for downloading content from each domain, the aggregate time for downloading the content of certain types of webpages, the aggregate time for downloading the content of different types of webpages, and the like.

At 506, at least some of the content is copied to an alternative source. For example, the content may be stored in the caches or other storage devices of proxy server 410.

At 508, the content from the alternative source is received. As described above, proxy server 410 uses different optimization techniques to deliver different types of resources to web browser 102 and speed up the rendering of the webpages in different ways. The optimization techniques include, but are not limited to, HTML streaming, techniques for optimizing the delivery of JavaScripts, techniques for optimizing the delivery of JPEG images, PNG images, WebP images, and the like. Each of the optimization techniques has a set of configurable parameters. In some embodiments, default parameters for the different optimization techniques stored in a template may be used to configure the various optimization techniques used by proxy server 410. In some embodiments, the template is selected from a library of templates based on the types and quantities of the resources that are downloaded at step 502.

At 510, the performance of the alternative source in delivering the content is evaluated. The performance can be measured using different metrics. One example of the metrics used for evaluating the performance is the time for downloading the content. There are many ways to measure the performance of the alternative source. Some illustrative examples include measuring the time for downloading each type of resources, the time for downloading content from each domain, the aggregate time for downloading the content of certain types of webpages, the aggregate time for downloading the content of all profiled webpages, and the like.

At 512, it is determined whether the alternative source should replace at least some of the plurality of initial sources as a source for delivering content of the website. The determination is based on the evaluated performances of the initial sources and the alternative sources in delivering the content of the website obtained by step 504 and step 510 described above. Different performance metrics of the initial sources and the alternative source may be compared, and different criteria may be used to determine whether the alternative source should replace a particular initial source in delivering the content that was originally delivered by that initial source. For example, the alternative source may replace a particular initial source if the performance improvement is above a certain predetermined threshold. In another example, the alternative source may replace all of the initial sources if the aggregate performance improvement is above a certain predetermined threshold.

After the determination at step 512 is made, proxy server 410 may begin to handle the delivery of content corresponding to the selected domains by mapping these selected domains to proxy server 410. For example, if JPEG images (e.g., domain 3) are now handled by proxy server 410, then domain 3 is now mapped to proxy server 410 instead of the CDN of the website. This mapping may be done by modifying the DNS entries. The modified DNS entries may be sent to an administrator who has authority to modify the DNS records for the website.

Figure 5B:
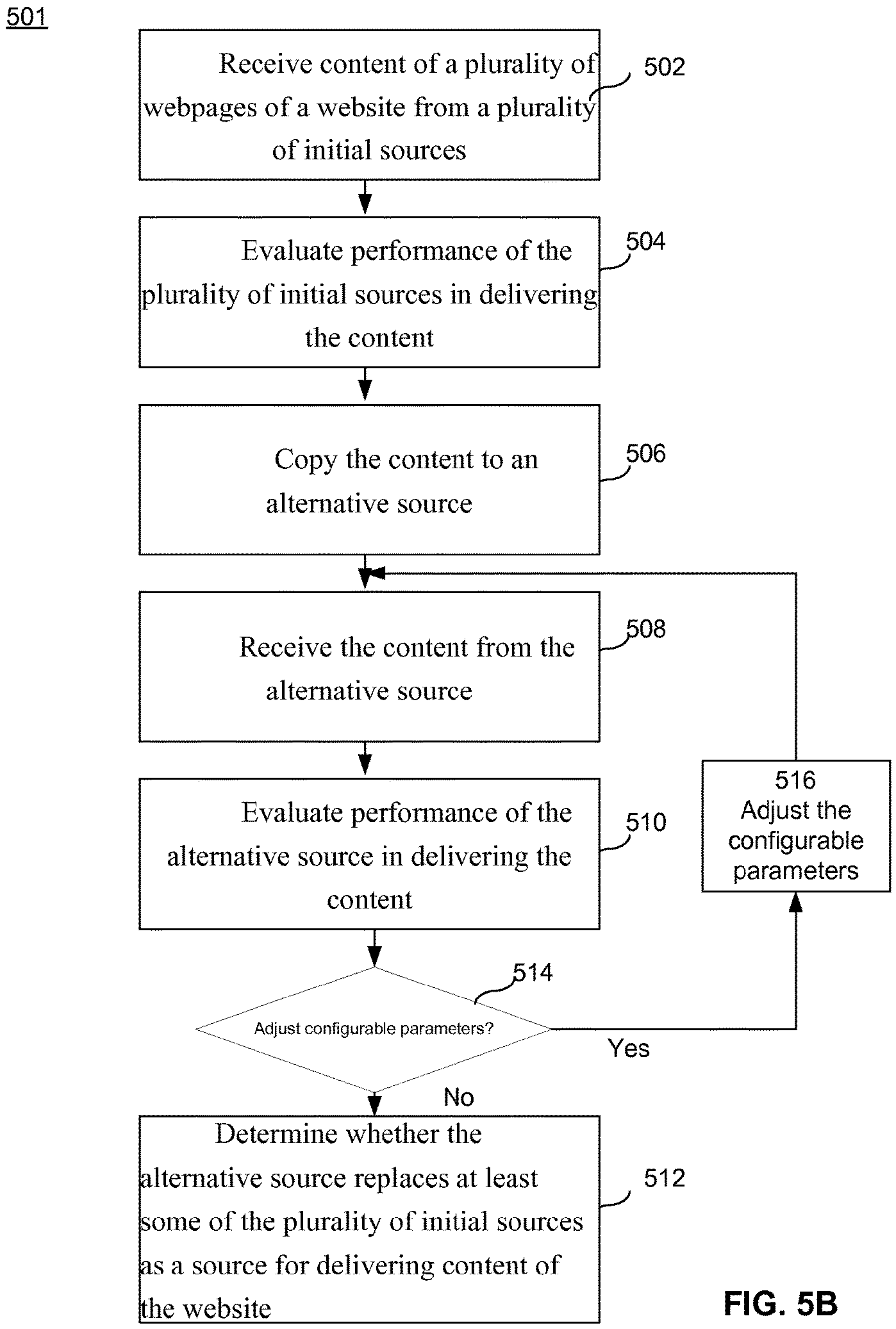
FIG. 5B is a flow chart illustrating an embodiment of a process 501 for determining one or more sources for delivery of content corresponding to a website.

FIG. 5B is a flow chart illustrating an embodiment of a process 501 for determining one or more sources for delivery of content corresponding to a website. In addition, process 501 automatically generates a set of configuration parameters for proxy server 410 to optimize the delivery of the content of a profiled website. Process 501 is similar to process 500, but instead of using default parameters for the various optimization techniques used by proxy server 410, the evaluated performances of the alternative source may be used as feedback into the system for fine tuning the configurable parameters a number of times. For example, after the performance of proxy server 410 configured with one set of parameters has been evaluated, the evaluated performance may be used as feedback to the system to adjust the parameters at 516, and then steps 508 and 510 may be performed again to re-evaluate the performance of proxy server 410 configured with the new set of parameters. Steps 508, 510, 514, and 516 may be iterated a plurality of times until a set of parameters is determined such that proxy server 410 is operating close to its optimum performance in delivering the content of the website. The set of parameters may include global parameters or parameters that are configurable on a per-webpage basis.

In some embodiments, different sets of parameters may be stored in templates, and one template is used to configure proxy server 410 for each iteration of steps 508, 510, 514, and 516. The templates may have different permutations of values for the configuration parameters. For example, one template (or one group of templates) may configure proxy server 410 to disable GIF image optimization. This particular template (or this group of templates) may provide better performances for websites that use many JPEG images but very few GIF images. The template that is found to give the best performance may be used by proxy server 410 for optimized delivery of the content of the tested website.

Figure 6:
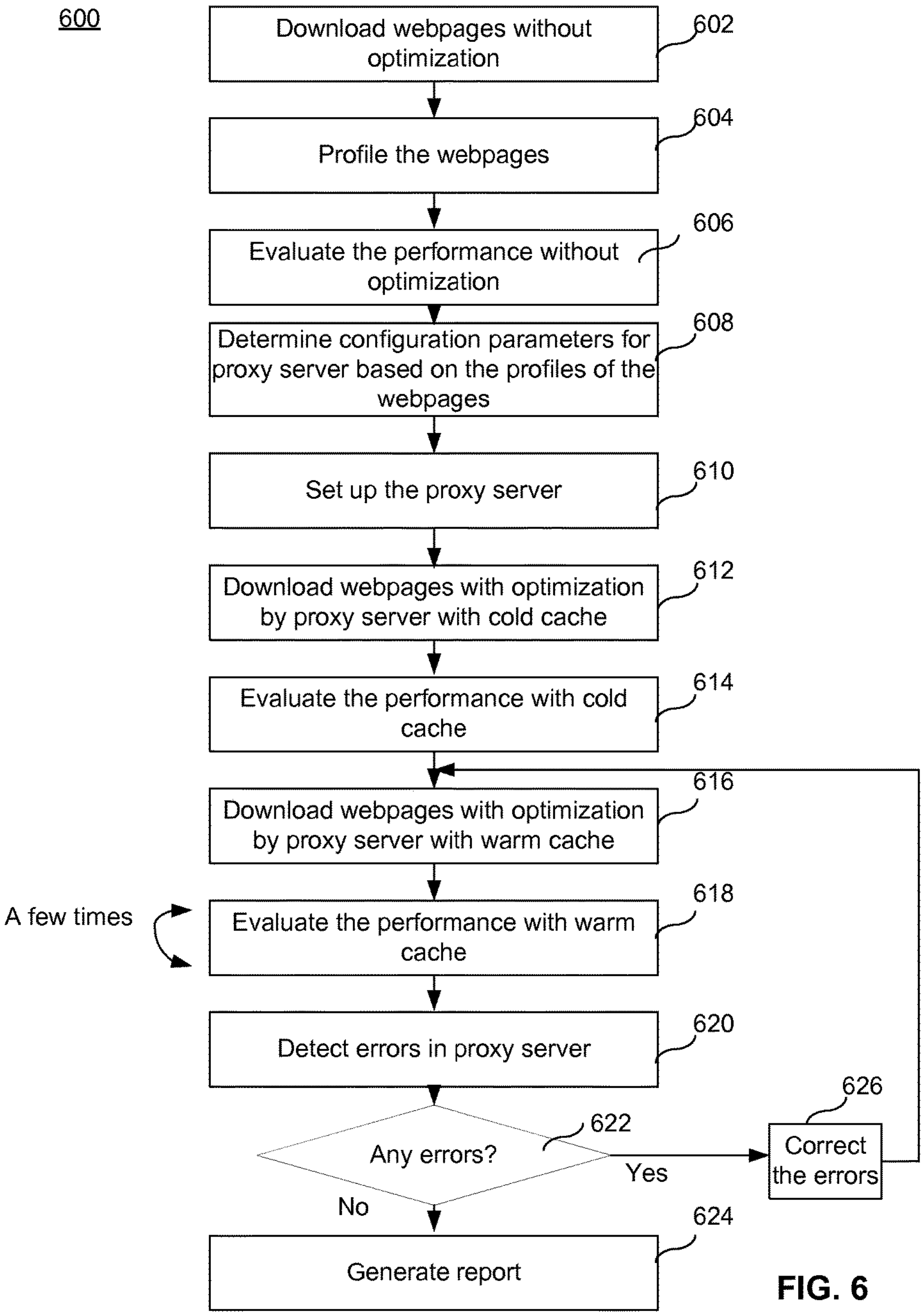
FIG. 6 is a flow chart illustrating an embodiment of a process 600 for determining one or more sources for delivery of content corresponding to a website.

FIG. 6 is a flow chart illustrating an embodiment of a process 600 for determining one or more sources for delivery of content corresponding to a website. At 602, webpages of a website are downloaded without any optimization by proxy server 410. At 604, the downloaded webpages are profiled. For example, the types of resources and the amount of each type of resources are determined and recorded. At 606, the performance of the initial sources is evaluated. At 608, configuration parameters for proxy server 410 are determined based on the profiles of the webpages. At 610, proxy server 410 is initialized and configured. At 612, webpages of the website are downloaded to web browser 102 via proxy server 410 with cold cache. At 614, the performance of the proxy server is evaluated. At 616, webpages of the website are downloaded to web browser 102 via proxy server 410 with warm cache. At 618, the performance of the proxy server is evaluated a plurality of times. At 620, errors in operating the proxy server are detected. If errors are detected at 622, then the errors are corrected at 626, and then the process returns to 616 such that the performance of the proxy server can be re-evaluated. If errors are not detected at 622, then reports are generated. The report may include the profiles of the webpages, performance results, domains that are selected to be optimized by proxy server, and an optimal set of configuration parameters for proxy server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering content corresponding to a website by a proxy server to a web browser, comprising:

receiving a plurality of webpage files of the website;

parsing the plurality of webpage files of the website to determine a plurality of initial sources, wherein an initial source comprises a content distribution node (CDN), each initial source hosting and delivering content referenced by the plurality of webpages files;

for each initial source: evaluating by a processor a performance of the initial source in delivering at least some of the content that is referenced by the plurality of webpage files;

copying to the proxy server the at least some of the content that is referenced by the plurality of webpage files and that is originally delivered by the initial source for optimized content delivery by the proxy server to the web browser, wherein the optimized content delivery by the proxy server comprises dividing the at least some of the content that is referenced by the plurality of webpage files into a plurality of segments and delivering the segments from the proxy server to the web browser individually based on priorities, and wherein the web browser downloads other content having a priority lower than a first segment but higher than a second segment during a time period after the delivering of the first segment but before the delivering of the second segment;

adjusting, by the proxy server, a number of iterations of a plurality of configurable parameters, wherein the configurable parameters are parameters related to the dividing of the at least some of the content that is referenced by the plurality of webpage files into the plurality of segments, after each adjustment, evaluating a performance of the proxy server in delivering the at least some of the content that is originally delivered by the initial source;

determining the plurality of configurable parameters resulting in a best evaluated performance of the proxy server in delivering the at least some of the content that is originally delivered by the initial source; determining whether the proxy server replaces the initial source in delivering the at least some of the content that is originally delivered by the initial source based at least in part on the evaluated performances of the proxy server and the initial source; and in the event that the proxy server replaces the initial source, configuring the proxy server with the determined plurality of configurable parameters resulting in the best evaluated performance.

2. The method of claim 1, wherein each of the initial sources corresponds to a different domain.

3. The method of claim 1, wherein the plurality of configurable parameters include parameters that are configurable on a per-webpage basis.

4. The method of claim 1, further comprising: replacing some of the initial sources by the proxy server as a source for delivery of content of the website by determining a modification to one or more DNS entries.

5. The method of claim 4, further comprising: sending the modification to an administrator of the website.

6. A proxy server for delivering content corresponding to a website to a web browser, comprising: a processor configured to:

receive a plurality of webpage files of the website;

parse the plurality of webpage files of the website to determine a plurality of initial sources, wherein an initial source comprises a content distribution node (CDN), each initial source hosting and delivering content referenced by the plurality of webpages files;

for each initial source: evaluate a performance of the initial source in delivering at least some of the content that is referenced by the plurality of webpage files;

copy to the proxy server the at least some of the content that is referenced by the plurality of webpage files and that is originally delivered by the initial source for optimized content delivery by the proxy server to the web browser, wherein the optimized content delivery by the proxy server comprises dividing the at least some of the content that is referenced by the plurality of webpage files into a plurality of segments and delivering the segments from the proxy server to the web browser individually based on priorities, and wherein the web browser downloads other content having a priority lower than a first segment but higher than a second segment during a time period after the delivering of the first segment but before the delivering of the second segment;

adjust, a number of iterations of a plurality of configurable parameters, wherein the configurable parameters are parameters related to the dividing of the at least some of the content that is referenced by the plurality of webpage files into the plurality of segments, after each adjustment, evaluating a performance of the proxy server in delivering the at least some of the content that is originally delivered by the initial source; determine the plurality of configurable parameters resulting in a best evaluated performance of the proxy server in delivering the at least some of the content that is originally delivered by the initial source;

determine whether the proxy server replaces the initial source in delivering the at least some of the content that is originally delivered by the initial source based at least in part on the evaluated performances of the proxy server and the initial source; and in the event that the proxy server replaces the initial source, configuring the proxy server with the determined plurality of configurable parameters resulting in the best evaluated performance; and a memory coupled to the processor and configured to provide the processor with instructions.

7. The proxy server of claim 6, wherein each of the initial sources corresponds to a different domain.

8. The proxy server of claim 6, wherein the plurality of configurable parameters include parameters that are configurable on a per-webpage basis.

9. The proxy server of claim 6, wherein the memory is further configured to provide the processor with instructions which when executed cause the processor to: replace some of the initial sources by the proxy server as a source for delivery of content of the website by determining a modification to one or more DNS entries.

10. The proxy server of claim 9, wherein the memory is further configured to provide the processor with instructions which when executed cause the processor to: send the modification to an administrator of the website.

11. A computer program product for delivering content corresponding to a website by a proxy server to a web browser, the computer program product being embodied in a non-transitory computer readable storage medium and comprising computer instructions for:

receiving a plurality of webpage files of the website;

parsing the plurality of webpage files of the website to determine a plurality of initial sources, wherein an initial source comprises a content distribution node (CDN), each initial source hosting and delivering content referenced by the plurality of webpages files;

for each initial source: evaluating by a processor a performance of the initial source in delivering at least some of the content that is referenced by the plurality of webpage files;

copying to the proxy server the at least some of the content that is referenced by the plurality of webpage files and that is originally delivered by the initial source for optimized content delivery by the proxy server to the web browser, wherein the optimized content delivery by the proxy server comprises dividing the at least some of the content that is referenced by the plurality of webpage files into a plurality of segments and delivering the segments from the proxy server to the web browser individually based on priorities, and wherein the web browser downloads other content having a priority lower than a first segment but higher than a second segment during a time period after the delivering of the first segment but before the delivering of the second segment;

adjusting, by the proxy server a number of iterations of a plurality of configurable parameters, wherein the configurable parameters are parameters related to the dividing of the at least some of the content that is referenced by the plurality of webpage files into the plurality of segments, after each adjustment, evaluating a performance of the proxy server in delivering the at least some of the content that is originally delivered by the initial source;

determining the plurality of configurable parameters resulting in a best evaluated performance of the proxy server in delivering the at least some of the content that is originally delivered by the initial source; determining whether the proxy server replaces the initial source in delivering the at least some of the content that is originally delivered by the initial source based at least in part on the evaluated performances of the proxy server and the initial source; and in the event that the proxy server replaces the initial source, configuring the proxy server with the determined plurality of configurable parameters resulting in the best evaluated performance.

12. The computer program product recited in claim 11, wherein each of the initial sources corresponds to a different domain.

* * * * *